(12) United States Patent
Yang et al.

(10) Patent No.: US 11,552,345 B2
(45) Date of Patent: Jan. 10, 2023

(54) POWER ARCHITECTURE DESIGN FOR THERMAL MANAGEMENT OF BATTERY BACKUP ENERGY STORAGE

(71) Applicant: Baidu USA LLC, Sunnyvale, CA (US)

(72) Inventors: Huawei Yang, Sunnyvale, CA (US); Shuai Shao, Sunnyvale, CA (US); Tianyi Gao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 685 days.

(21) Appl. No.: 16/545,546

(22) Filed: Aug. 20, 2019

(65) Prior Publication Data

US 2021/0057787 A1  Feb. 25, 2021

(51) Int. Cl.
| | |
|---|---|
| *H01M 10/613* | (2014.01) |
| *H01M 10/6557* | (2014.01) |
| *H01M 10/6567* | (2014.01) |
| *H01M 50/20* | (2021.01) |
| H01M 10/625 | (2014.01) |

(52) U.S. Cl.
CPC ..... *H01M 10/613* (2015.04); *H01M 10/6557* (2015.04); *H01M 10/6567* (2015.04); *H01M 50/20* (2021.01); *H01M 10/625* (2015.04); *H01M 2200/00* (2013.01); *H01M 2220/20* (2013.01)

(58) Field of Classification Search
None
See application file for complete search history.

(56) References Cited

U.S. PATENT DOCUMENTS

2016/0276719 A1* 9/2016 Kikuchi ................. B60L 58/26
2019/0217721 A1* 7/2019 Marcicki ............. H01M 10/625

* cited by examiner

*Primary Examiner* — Christopher P Domone
(74) *Attorney, Agent, or Firm* — Womble Bond Dickinson (US) LLP (57) ABSTRACT

Thermal management of a backup battery unit for datacenter applications is described. In one embodiment, a backup battery unit includes one or more battery cells immersed in cooling liquid contained in an immersion tank. The immersion tank includes a temperature sensor. The battery unit also includes a first direct-current to-direct-current (DC/DC) converter electronically coupled to the battery cells and to an external power source for converting and controlling a charging voltage obtained from the external power source to charge the battery cells. The backup battery unit also includes a cooling-liquid pump for driving cooling liquid to the battery cells. The backup battery unit also includes a microcontroller coupled to the temperature sensor, the first DC/DC converter, and the cooling-liquid pump. The microcontroller is configured to control operations of the cooling-liquid pump based on temperature data obtained from the temperature sensor and an electrical current of the first DC/DC converter.

20 Claims, 11 Drawing Sheets

POWER ARCHITECTURE DESIGN FOR THERMAL MANAGEMENT OF BATTERY BACKUP ENERGY STORAGE

TECHNICAL FIELD

Embodiments of the present disclosure relate generally to a cooling apparatus and system. More particularly, embodiments of the disclosure relate to thermal management of a battery backup unit installed in a datacenter environment.

BACKGROUND

A battery pack consists of battery cells connected in series, in parallel or, a combination of both. The battery cells generate heat during discharging and charging. The speed of discharging is positively correlated with the heat generated. A cooling system for the battery pack is very important because a higher temperature or a lower temperature may negatively impact the battery performance as well as battery health conditions. Since multiple cells are connected together, a significant difference in internal temperature values can lead to different charging and discharging rates for different cells and thus cause the battery pack performance to deteriorate.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

A battery pack consists of battery cells connected in series, in parallel or, a combination of both. The battery cells generate heat during discharging and charging. The speed of discharging is positively correlated with the heat generated. A cooling system for the battery pack is very important because a higher temperature or a lower temperature may negatively impact the battery performance as well as battery health conditions. Since multiple cells are connected together, a significant difference in internal temperature values can lead to different charging and discharging rates for different cells and thus cause the battery pack performance to deteriorate. Therefore, the battery thermal management system plays a vital role in the design and operation of the battery pack, and has a direct impact on the performance of the battery pack. In addition, a bad design of a thermal system may result in the BBU failed to function, such as failure to satisfy the backup time needed. Several conventional battery thermal management systems for cooling electric vehicles exist. These include, for example, the air cooling system, the passive or active liquid system, and the thermos-electric system. However, such systems are insufficient.

According to some embodiments, a battery backup unit (BBU) immersion cooling system design provides thermal management to battery cells for managing the temperature of a backup battery unit for data center applications. The backup battery unit is used as a backup power source or an energy storage device for applications such as data centers. The battery cells may be submerged into coolant contained in a coolant tank or immersion tank. When the battery cells charge and discharge, they may heat up. To control the temperature of the battery cells, a pump is attached to the immersion tank that pumps cooling fluid into the immersion tank when the temperature of the battery cells rise above a threshold level as determined by a temperature sensor within or adjacent to the battery cells. In particular embodiments, a cooling fan also contributes to cooling the battery cells. Charging and discharging both affect the temperature of the battery cells differently. Therefore, the thermal management of the battery cells must be treated differently depending on whether the battery cells are charging or discharging. Different thermal management requires different power architecture for both the battery cooling and the charging and discharging functions. This disclosure contemplates enabling improved battery energy storage and thermal management in battery cells for a data center.

Systems, methods, and articles described herein provide a power system architecture and associated control algorithm to supply the pump and optionally the fan power needed in the BBU immersion cooling system. When the battery is charging, the system may convert power from the BBU input power source to the pump power to drive the cooling fluid to the battery cells. The BBU immersion cooling system can also power the fan(s) if fans are included in the BBU immersion cooling system. A control algorithm may take the measurements from one or more sensors, including temperature, liquid level, voltages, and currents to determine the working condition of the pump and fans through controlling the power converter. In addition, the control algorithm may execute a self-inspection process for both the cooling and power components in the BBU immersion cooling system.

At a high level, there may be three different main schematic configurations for thermal management control of the BBU. For charging, there may be one main configuration, and for discharging there may be two main configurations: discharging with or without a discharging converter. To cool the battery cells, either air or liquid cooling may be used. In some embodiments, both air and liquid cooling may be used. If liquid cooling only is used, no fan may be needed. Regardless of the different configurations, some common principles and associated circuit schematics may be shared among all the configurations. First, in every configuration, a liquid temperature sensor may be used to measure the temperature near the battery cells. This may be used to determine when to start the pump and control its speed to accommodate the needed flow while transmitting the heat generated by the battery cells from inside the immersion tank to outside the immersion tank. Second, a current sensor may be placed near the battery cells after a switch (which may be a bidirectional power switch) to measure the charging and discharging current for control and protection purposes. Third, a DC/DC converter may be used to convert and control the charging voltage and current from an external power source. Fourth, another dedicated DC/DC converter may be connected near the battery cells to power the liquid pump and the fan (if present). The input voltage and speed of the pump may be sensed and transmitted to a microcontroller, where a control signal may be generated and sent back to the pump for speed control. Similarly, if fans are present, the speed of the fan may also be controlled by the microcontroller. Fifth, both the output and the input voltages and currents are sensed by a sensor for feedback control and protection purposes. Finally, a liquid-level sensor is placed inside the immersion tank for self-inspection and protection purposes.

In some embodiments, a discharging converter may not be necessary if the output voltage of the battery cells is not required to be regulated. If a discharging converter is not needed, the charging converter may be designed to serve a charging purpose only. However, if a discharging converter is needed, either another dedicated discharging converter may be needed, or the charging converter can be designed to have bidirectional functionality to serve as both a charging converter and a discharging converter.

Figure 1:
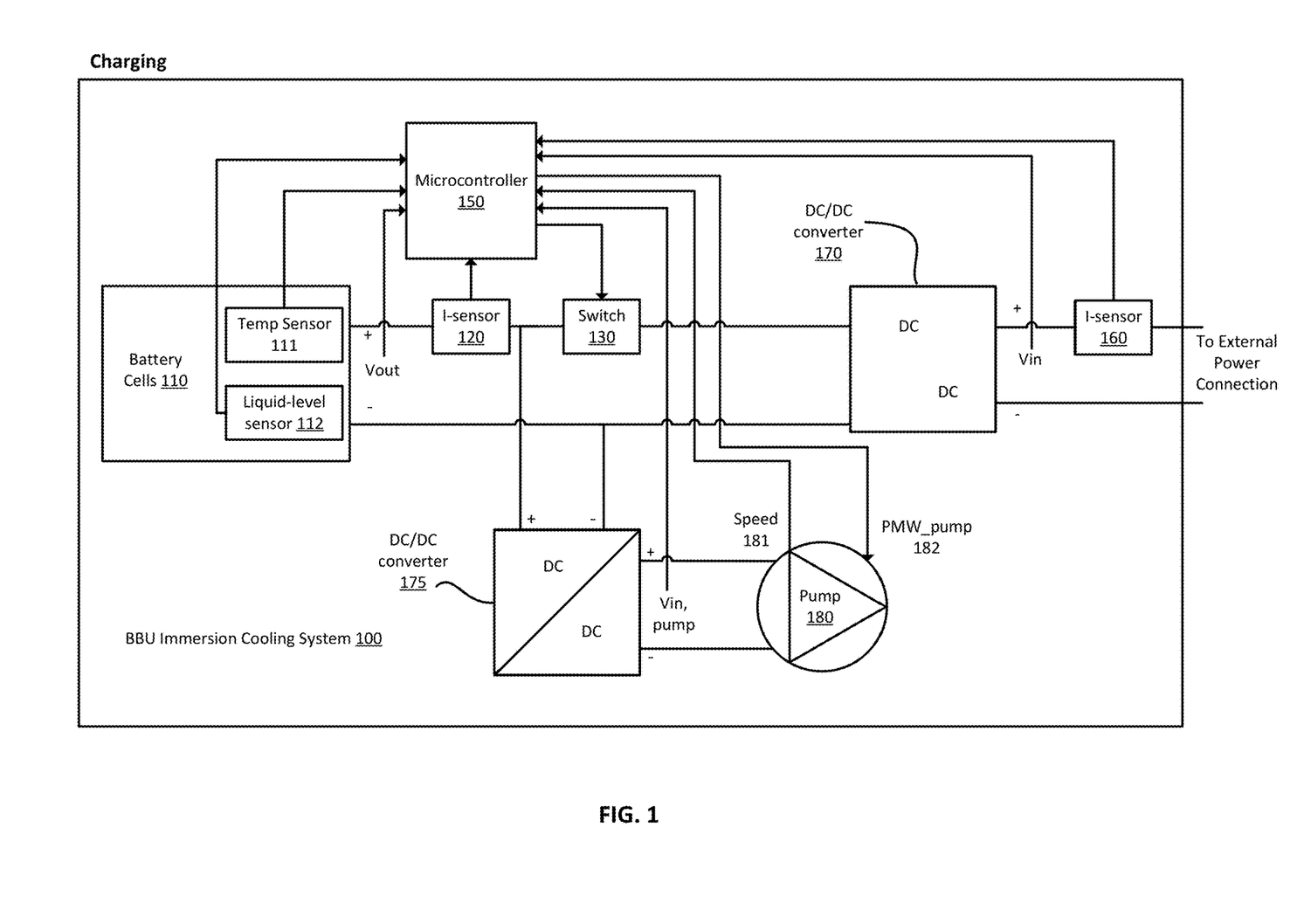
FIG. 1 is a block diagram illustrating a power architecture design for a backup-battery unit (BBU) in a charging state.

FIG. 1 is a block diagram illustrating a power architecture design for a backup-battery unit (BBU) immersion cooling system in a charging state. BBU immersion cooling system 100 may include battery cells 110 enclosed in an immersion tank. Adjacent to the battery cells 110 may be placed a temperature sensor 111 and a liquid-level sensor. A cooling-liquid pump 180 may be provided to drive cooling fluid to the battery cells 110. The cooling-liquid pump 180 may also be referred to herein as pump 180. The BBU immersion cooling unit may also include a microcontroller 150, a current sensor ("I-sensor") 120, a switch 130, and DC/DC converter 175. A signal of the input voltage for the pump ("Vin, pump") may be sent to the microcontroller 150, as well as a speed 181 for the pump. The microcontroller 150 may send to the pump a signal specifying pulse width modulation ("PMW_pump") for the pump. Pulse width modulation may be a method of reducing the average power delivered by an electrical signal, by effectively chopping it up into discrete parts. The average value of voltage (and current) fed to the load is controlled by turning the switch between supply and load on and off at a fast rate. In particular embodiments, the I-sensor 120 may be included in the BBU immersion cooling system 100 for measuring a charge current and a discharge current. The I-sensor 120 may be electronically coupled to the microcontroller.

As the battery cells 110 charge, their temperature may increase. Temperature sensor 111 may continuously or periodically take a temperature measurement of a surface of the battery cells 110. If the measured temperature rises above a threshold level, the temperature sensor may send a signal to the microcontroller 150. Microcontroller 150 may then send a PMW_pump 182 signal to the pump 180 to activate its pumping mechanism. The pump 180 may then pump cooling liquid toward battery cells 110 to cool them down. The BBU immersion cooling system 100 may also include a first DC/DC converter 170 and a second DC/DC converter 175.

In particular embodiments, the BBU immersion cooling system 100 may include one or more battery cells 110 immersed in cooling liquid contained in an immersion tank, the immersion tank comprising a temperature sensor 111. The BBU immersion cooling system 100 may also include a first direct-current to-direct-current (DC/DC) converter 170 electronically coupled to the battery cells and to an external power source for converting and controlling a charging voltage obtained from the external power source to charge the battery cells 110. The BBU immersion cooling system may also include a cooling-liquid pump 180 for driving cooling liquid to the battery cells. The BBU immersion cooling system may also include a microcontroller 150 coupled to the temperature sensor 111, the first DC/DC converter 170 and the cooling-liquid pump 180, wherein the microcontroller 150 controls operations of the cooling-liquid pump 180 based on temperature data obtained from the temperature sensor 111 and an electrical current of the first DC/DC converter 170.

Figure 2:
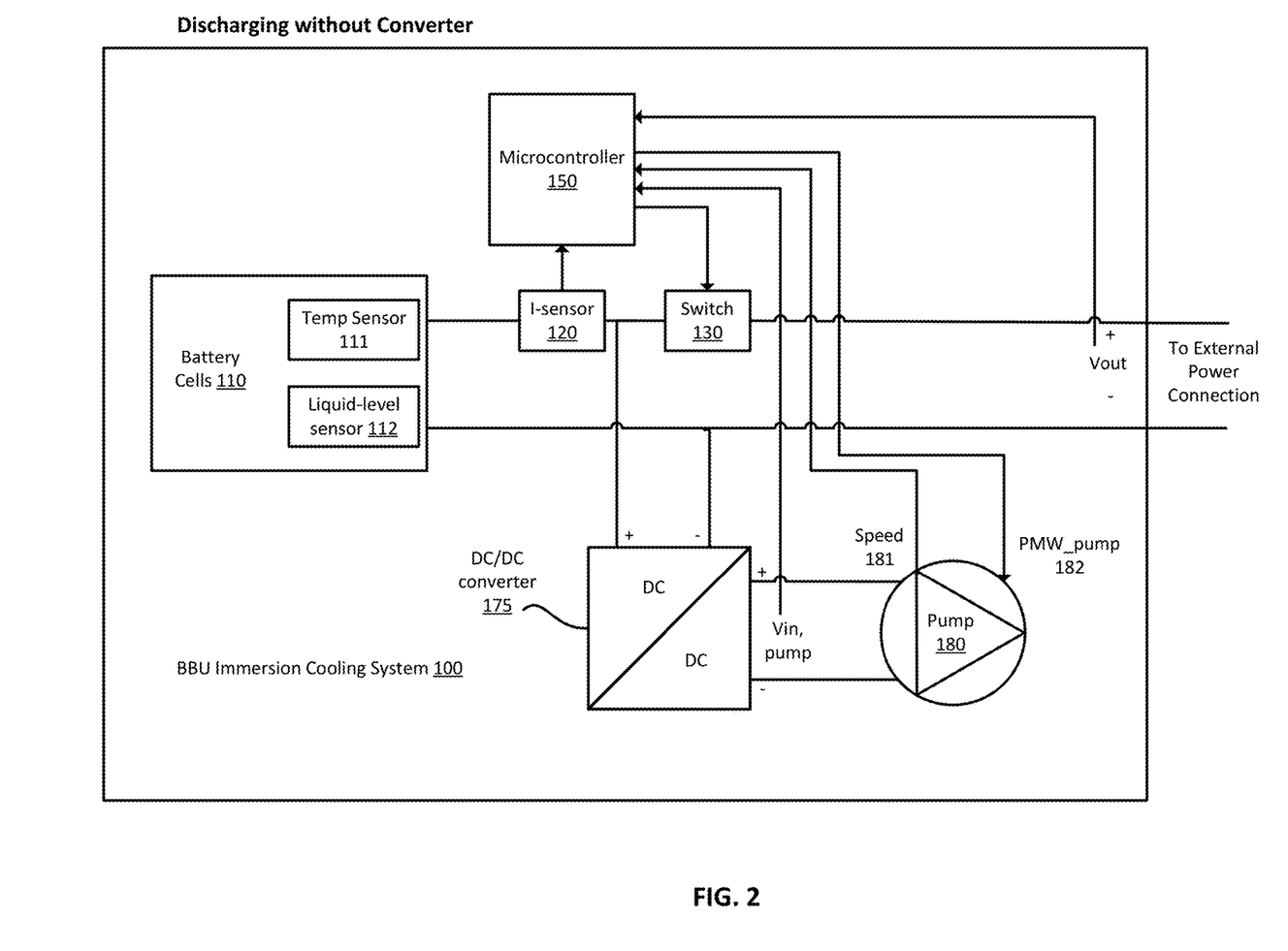
FIG. 2 is a block diagram of a power architecture design for a BBU in a discharging state without a discharging converter.

FIG. 2 is a block diagram of a power architecture design for a BBU immersion cooling system 100 in a discharging state without a discharging converter. In some embodiments, a discharging converter may not be necessary if the output voltage of the battery cells is not required to be regulated. If a discharging converter is not needed, the DC/DC converter 175 may be designed to serve for charging purposes only. However, if a discharging converter is needed, either another dedicated discharging converter may be needed, or the DC/DC converter 175 can be designed to have bidirectional functionality to serve as both a charging converter and a discharging converter.

In the configuration illustrated in FIG. 2, the battery cells 110 may be directly connected to an external connection through a switch 130 that may be controlled by the microcontroller 150. In particular embodiments, when the BBU immersion cooling system 100 is in the charging state, when the switch 130 is closed the battery cells 110 may be charging, and when the switch 130 is open the battery cells 110 may not be charging. In particular embodiments, the switch 130 may be a bidirectional power switch. In this configuration, voltage regulation may not be required. Due to the relatively large discharging current, the temperature rise of the battery cells 110 may be significant. The temperature rise may be high enough that the threshold temperature is surpassed which may cause the cooling-liquid pump 180 to begin driving cooling fluid to the battery cells 110. The heat dissipation of individual cells of the battery cells 110 may be different for each individual cell. This difference in heat dissipation may be based on the different current levels in each cell of battery cells 110. In other embodiments, the temperature of each cell of battery cells 110 may be equal to one another. To regulate the heat dissipation, the microcontroller 150 may adjust the pump speed by sending different PMW signals as PMW_pump 182 signals. The DC/DC converter 175 for the pump may also be controlled by the controller through voltage control or current control.

Figure 3:
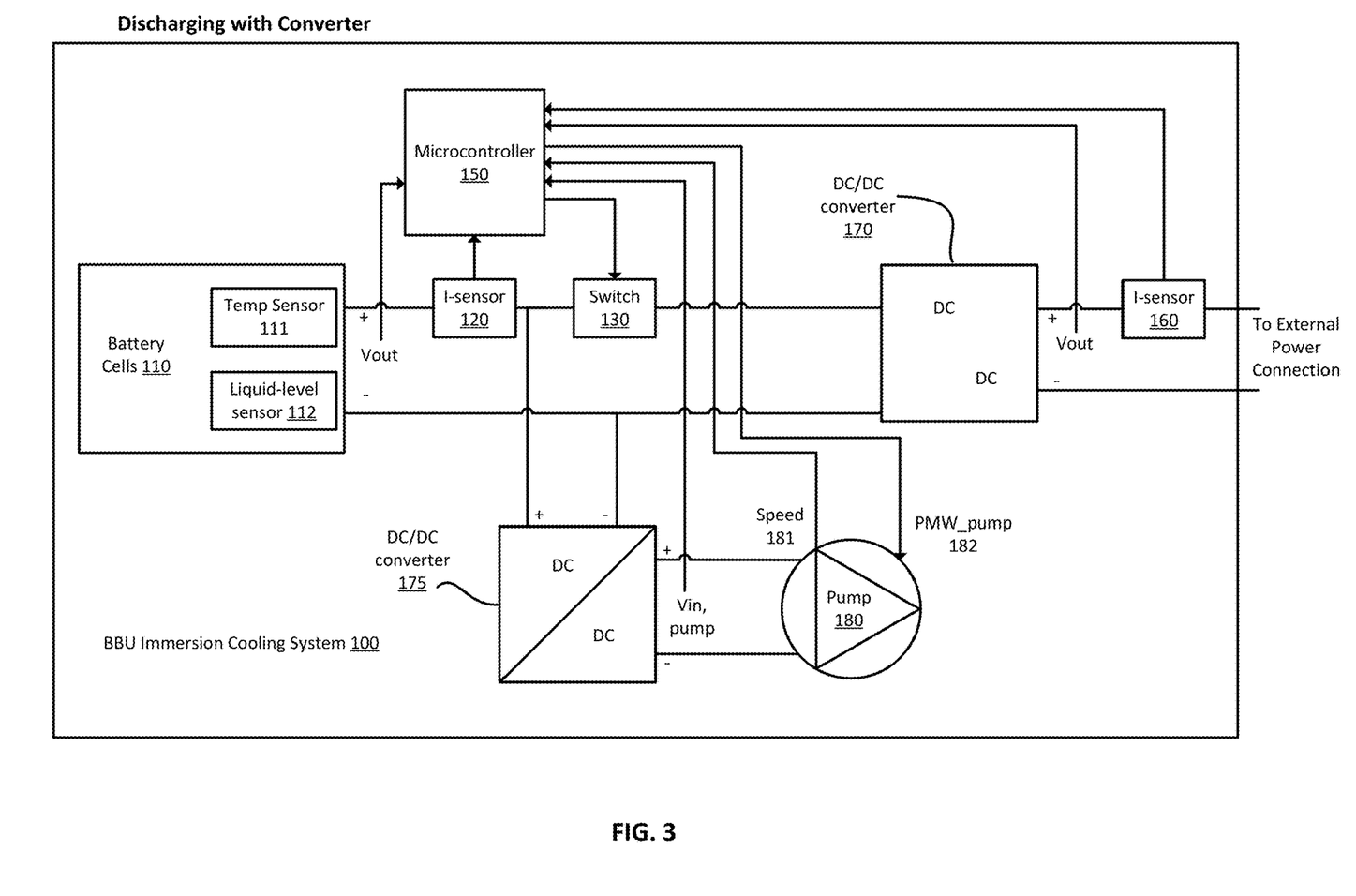
FIG. 3 is a block diagram of a power architecture design for a BBU in a discharging state with a discharging converter.

FIG. 3 is a block diagram of a power architecture design for a BBU immersion cooling system in a discharging state with a discharging converter. In this configuration, the discharging converter is DC/DC converter 170. Thus, in particular embodiments, the BBU immersion cooling system 100 may also include a second DC/DC converter (e.g., DC/DC converter 170) that is coupled to the battery cells 110 and the pump 180 for regulating a voltage level at the pump 180. Although a DC/DC converter is illustrated, this disclosure contemplates any suitable voltage or current converter, such as an AC/DC converter. The power architecture design illustrated in FIG. 3 includes DC/DC converter 170 that is placed in series with the battery cells 110 for converting the cells' moving voltage to a stable voltage at the external power connection. A switch 130 may be connected in series with the input of the DC/DC converter 170 for protection purposes. For example, if the discharge voltage of the battery cells 110 becomes too high, the switch 130 may open and cut off the current supplied to the external power connection. As another example, if the I-sensor 120 determines that the discharge current surpasses a current threshold, the I-sensor 120 may send a signal to the microcontroller 150 which may then send a signal to switch 130 with instructions to open. Another sensor, I-sensor 160, may be added near the output of the BBU immersion cooling system 100 for current control and protection purposes. As an example, if the I-sensor 160 determines that the discharge current surpasses a current threshold, the I-sensor 160 may send a signal to the microcontroller 150 which may then send a signal to switch 130 with instructions to open. All other components and functionalities may remain as they are illustrated and discussed with regard to FIG. 2.

Figure 4:
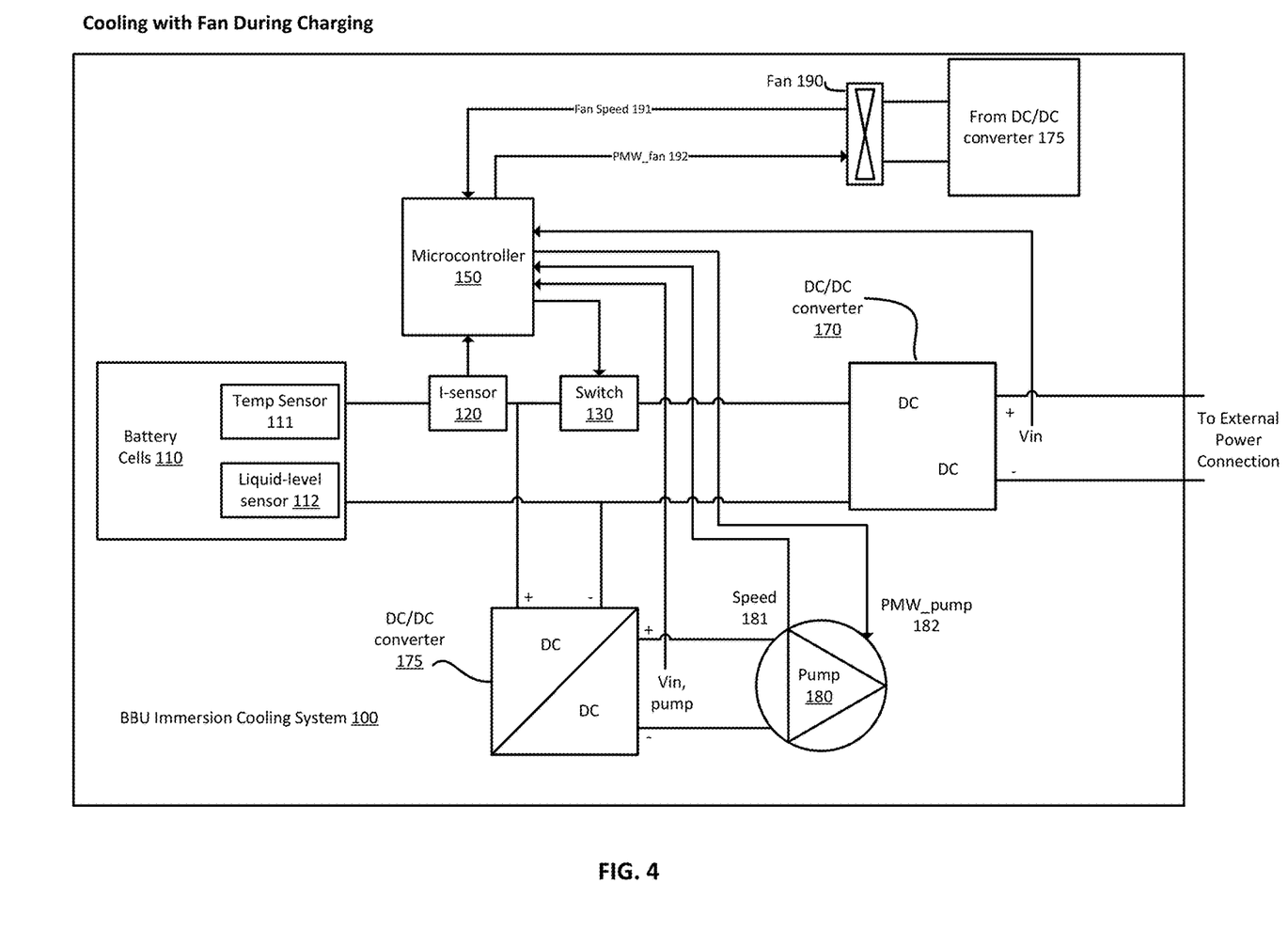
FIG. 4 is a block diagram of a power architecture design for a BBU in a charging state with an added fan for air cooling during charging.

FIG. 4 is a block diagram of a power architecture design for a BBU immersion cooling system 100 in a charging state with an added fan 190 for air cooling during charging. The fan 190 can take the same input from the DC/DC converter 175 that powers the pump 180. This may be the case if the required voltage of the fan 190 is the same as the required voltage of the pump 180. The fan speed 191 may be fed back into the micro controller for speed control with the PMW_fan 192 signal. This may also be how the speed of the pump 180 is controlled. The pump 180 may send a speed 181 signal to the microcontroller, and, depending on the temperature received from the temperature sensor 111, the microcontroller 150 may send a PMW_pump 182 signal back to the pump 180 to increase or reduce its speed. Although this disclosure describes adjusting the speed of a pump and fan in a particular manner, this disclosure contemplates adjusting the speed of a pump and fan in any suitable manner.

Figure 5:
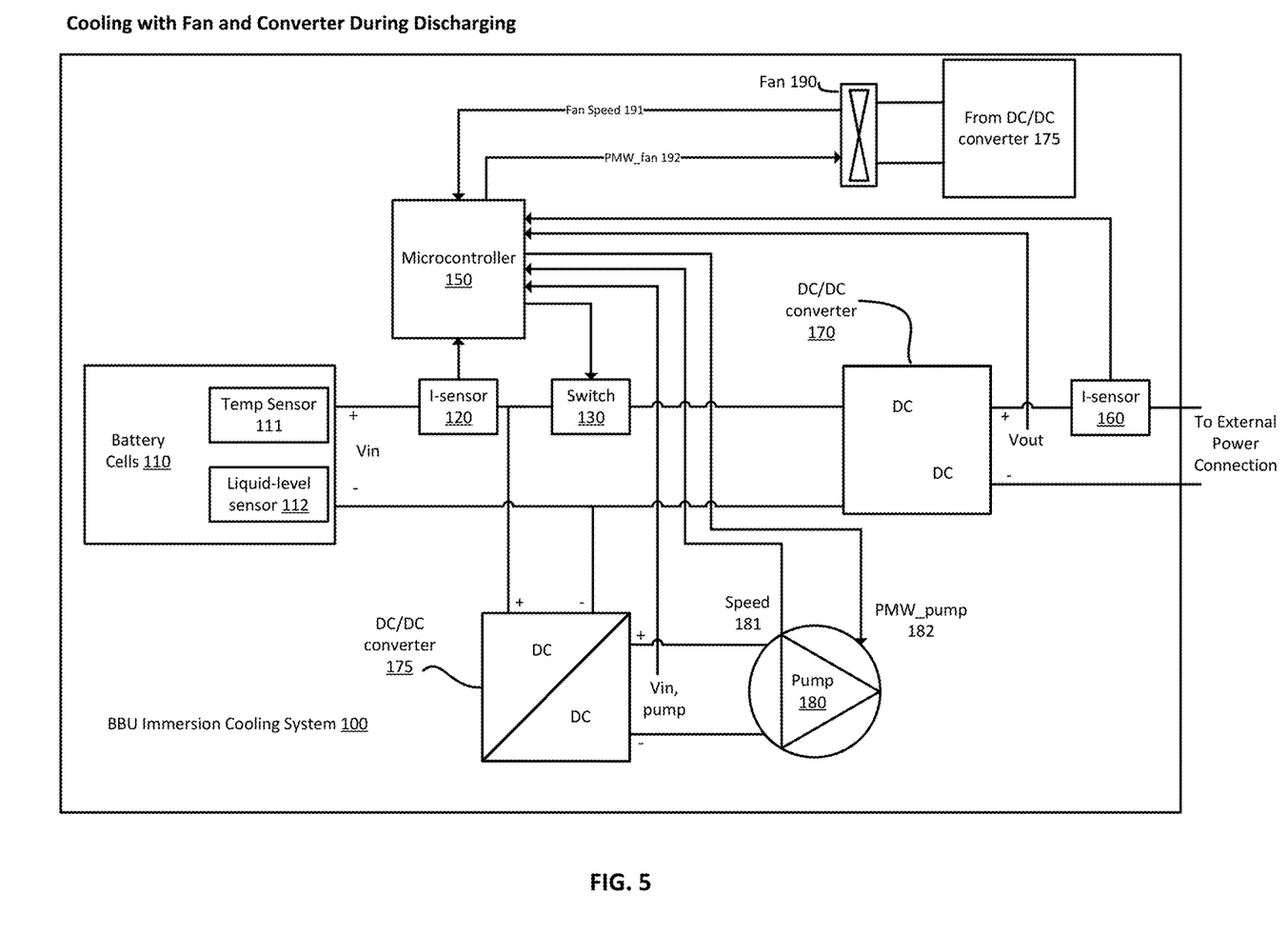
FIG. 5 is a block diagram of a power architecture design for a BBU in a discharging state with a discharge converter and with an added fan for air cooling during charging.

FIG. 5 is a block diagram of a power architecture design for a BBU immersion cooling system 100 in a discharging state with a discharge converter and with an added fan for air cooling during charging. In this configuration, the discharge converter may be the DC/DC converter 170. Although a DC/DC converter is illustrated, this disclosure contemplates any suitable voltage or current converter, such as an AC/DC converter. The power architecture design illustrated in FIG. 3 includes DC/DC converter 170 that is placed in series with the battery cells 110 for converting the cells' moving voltage to a stable voltage at the external power connection. A switch 130 may be connected in series with the input of the DC/DC converter 170 for protection purposes. For example, if the discharge voltage of the battery cells 110 becomes too high, the switch 130 may open and cut off the current supplied to the external power connection. As another example, if the I-sensor 120 determines that the discharge current surpasses a current threshold, the I-sensor 120 may send a signal to the microcontroller 150 which may then send a signal to switch 130 with instructions to open. Another sensor, I-sensor 160, may be added near the output of the BBU immersion cooling system 100 for current control and protection purposes. As an example, if the I-sensor 160 determines that the discharge current surpasses a current threshold, the I-sensor 160 may send a signal to the microcontroller 150 which may then send a signal to switch 130 with instructions to open. The fan 190 can take the same input from the DC/DC converter 175 that powers the pump 180. This may be the case if the required voltage of the fan 190 is the same as the required voltage of the pump 180. The fan speed 191 may be fed back into the micro controller for speed control with the PMW_fan 192 signal.

Figure 6:
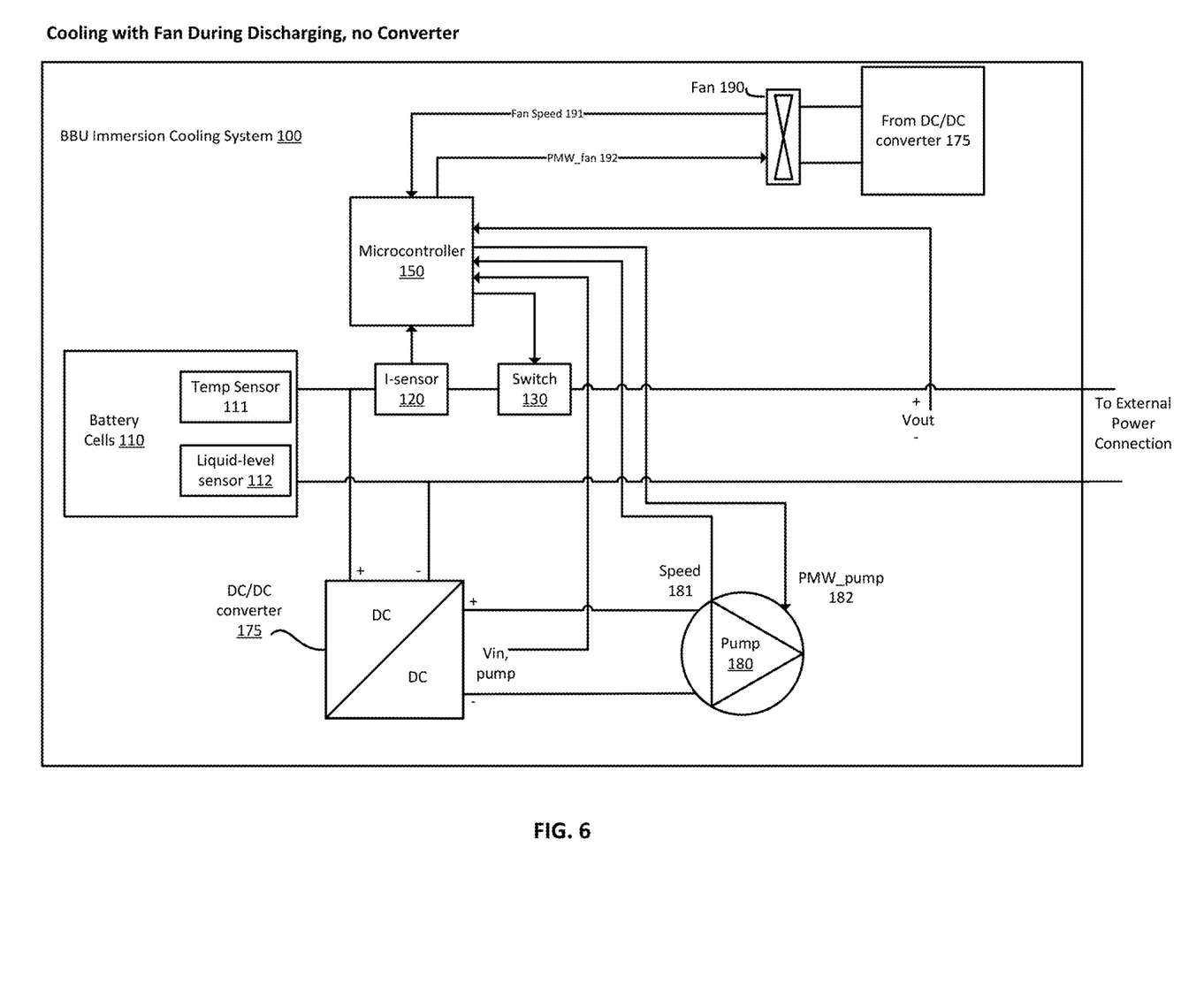
FIG. 6 is a block diagram of a power architecture design for a BBU in a discharging state without a discharge converter and with an added fan for air cooling during charging.

FIG. 6 is a block diagram of a power architecture design for a BBU immersion cooling system in a discharging state without a discharge converter and with an added fan for air cooling during charging. In this configuration, the battery cells 110 may be directly connected to an external connection through a switch 130 that may be controlled by the microcontroller 150. In this configuration, voltage regulation may not be required. Due to the relatively large discharging current, the temperature rise of the battery cells 110 may be significant. The temperature rise may be high enough that the threshold temperature is surpassed which may cause the cooling-liquid pump 180 to begin driving cooling fluid to the battery cells 110. The heat dissipation of individual cells of the battery cells 110 may be different for each individual cell. This difference in heat dissipation may be based on the different current levels and health conditions in each cell of battery cells 110. In other embodiments, the temperature of each cell of battery cells 110 may be equal to one another. To regulate the heat dissipation, the microcontroller 150 may adjust the pump speed by sending different PMW signals as PMW_pump 182 signals. The DC/DC converter 175 for the pump may also be controlled by the controller through voltage control or current control.

Figure 7:
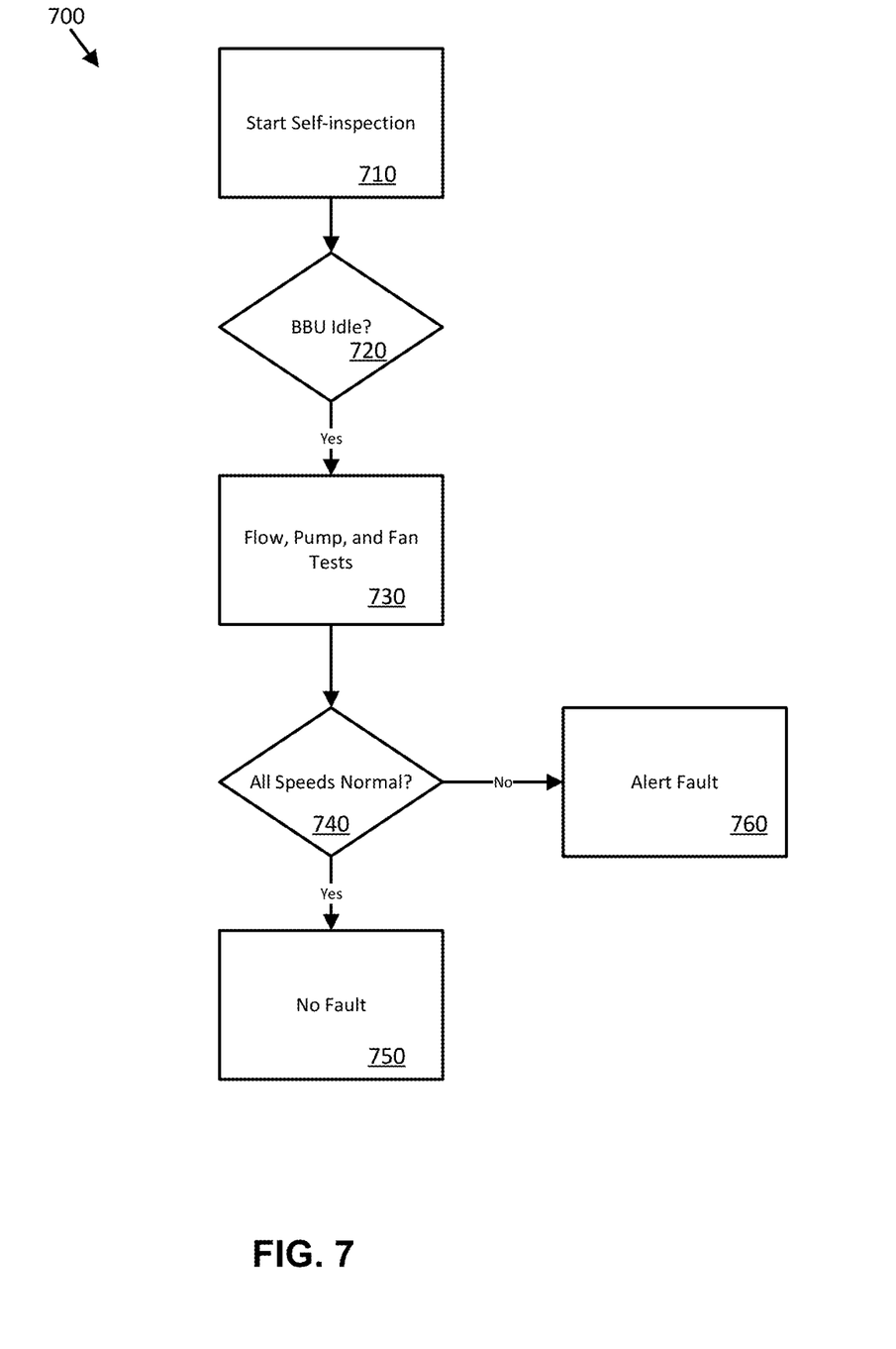
FIG. 7 is a block diagram of a self-inspection process of a BBU.

FIG. 7 is a block diagram of a self-inspection process 700 of a BBU immersion cooling system 100. The BBU immersion cooling system 100 may be configured to self-inspect for any faults in the system. When the battery cells 100 are idle (e.g., they are not charging or discharging), the pump and fan, if present, may be inspected to check the fluid flow and speed to determine whether the system is operating properly. If it is not operating properly, computer logic within the system may pass an alert signal to an upper monitoring or management system to indicate a fault in the system exists. The self-inspection process may begin at step 710, where computer logic in the system starts the self-inspection. At step 720, the computer logic determines whether the BBU is idle. Generally, the BBU is idle if battery cells 110 are not charging or discharging. If the BBU is idle, the computer logic may proceed to step 720, where the computer logic may perform a series of tests: a flow test, a pump test, and a fan test. The flow test may test how the fluid is flowing in the system. The flow test may be aided at least in part by a signal from the liquid-level sensor 112 or a flow meter (not illustrated). The liquid-level sensor 112 may indicate the level of the liquid within the BBU immersion cooling system 100. The pump and fan tests may test the functioning of the pump 180 and fan 190, respectively. For example, the pump test may determine whether the pump's speed is functioning properly. At step 740, the computer logic may determine whether all the speeds are normal or are functioning properly. If any speed is not normal, the computer logic may proceed to step 760 and generate an alert signal and send it to an upper monitoring or management system to indicate a fault in the system exists. If all speeds are normal, the computer logic may proceed to step 750, which may end the self-inspection process 700.

Figure 8:
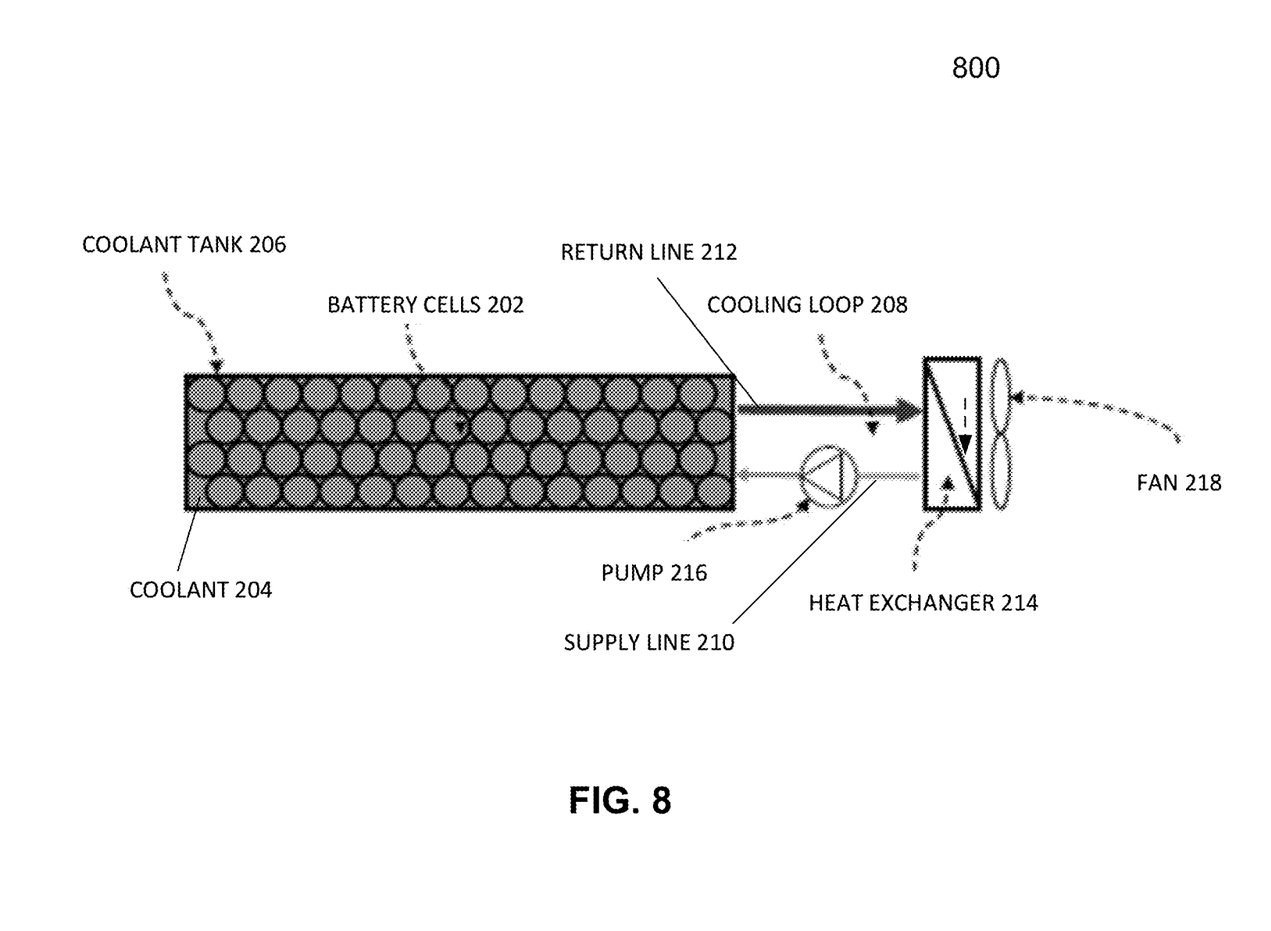
FIG. 8 shows an example of a backup battery module according to one embodiment.

FIG. 8 shows an example of a battery module according to one embodiment. Referring to FIG. 8, battery module 800 includes a number of battery cells 202 submerged in coolant 204 contained in a coolant tank 206. As shown in FIG. 8, battery cells 202 are connected in series-parallel. The cooling loop 208 includes the coolant tank 206 that contains the majority of the coolant fluid 204, a supply line 210, a return line 212, and a cooling device such as a heat exchanger 214. In this embodiment, a fluid pump 216 is disposed on the supply line and is operable to facilitate circulation of the coolant 204. Alternatively, pump 216 may be disposed on the return line 212 or additional pump may be dispose don the return line 212. The heat exchanger 214 may be either an air-to-liquid heat exchanger or alternatively, heat exchanger 214 can be a liquid-to-liquid heat exchanger.

In one embodiment, a fan 218 is used for moving the air and facilitating the operation of the heat exchanger 214. In one embodiment, data center cooling air (i.e., lower-temperature air centrally supplied in the data center) is used to cool the heat exchanger 214. If a phase change coolant 204 is used, vapor condensation occurs within the heat exchanger 214. The phase change takes place in both the coolant tank 206 and the heat exchanger 214.

Figure 9:
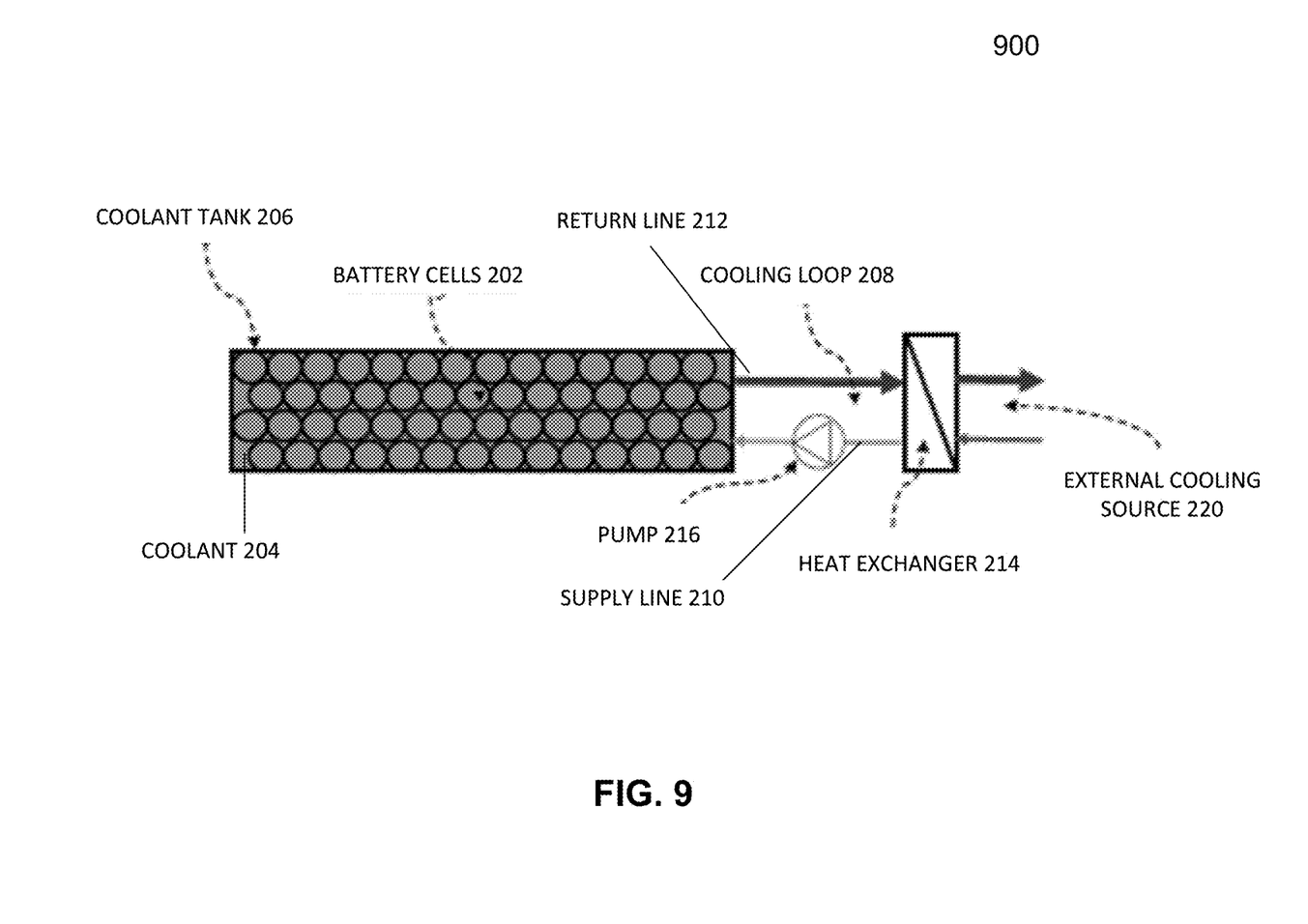
FIG. 9 shows an example of a backup battery module according to another embodiment.

Referring now to FIG. 9, the heat exchanger 214 is connected to an external cooling source 220. In a different embodiment, the external cooling source 220 may be a data center cooling water system or an IT liquid cooling water system. In this example as shown in FIG. 9, heat exchanger 214 is a liquid-to-liquid heat exchanger. The cooling loop between heat exchanger 214 and external cooling source 220 may be referred to as a primary loop, while the cooling loop between heat exchanger 214 and coolant tank 206 may be referred to as a secondary loop. External cooling source 220 may be a part of a rack liquid manifold disposed within an electronic rack in which backup battery module 900 is located or a coolant distribution unit (CDU) located within the electronic rack. When a single phase coolant is used, both the supply and return lines are liquid lines. In the two-phase coolant design, the supply line 210 is a liquid line, while the return line 212 is a vapor line. The diameter of the vapor line may be larger than the diameter of the liquid line.

Figure 10:
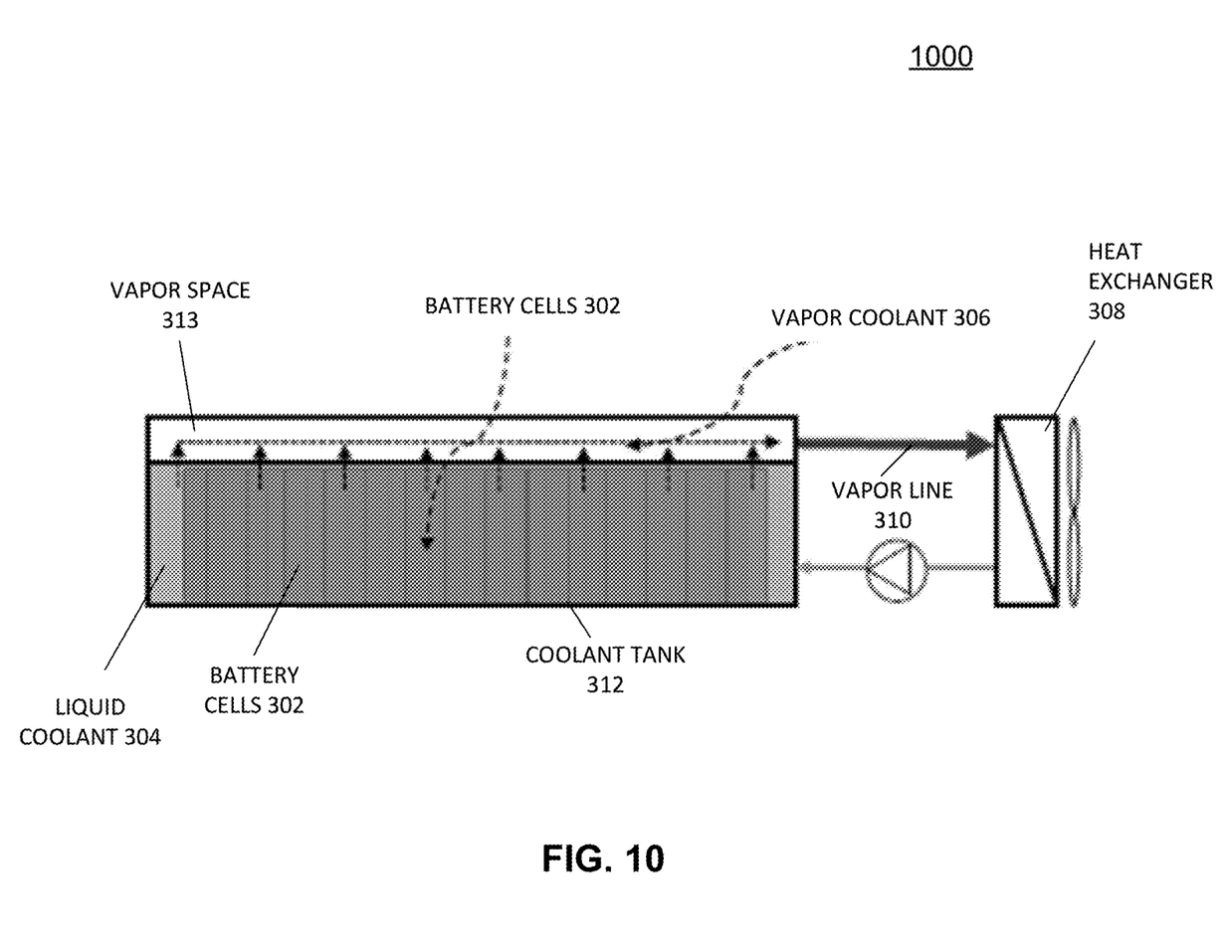
FIG. 10 shows an example backup battery module having a cooling system according to one embodiment.

Referring to FIG. 10, an example backup battery module 1000 having a cooling system according to one embodiment is shown. In this embodiment, a two-phase coolant is used. When the battery cells 302 generate heat, the liquid coolant 304 extracts the heat from the battery cells, and the coolant changes from a liquid phase to a vapor phase. The low density vapor coolant 306 ascends in the coolant tank 312 and travels to the heat exchanger 308 through a vapor return line 310. In other words, in this embodiment, the coolant tank 312, which is also a battery chamber, is not fully filled, and a space 313 is reserved toward the top of the coolant tank 312 to allow for the generation of the vapor 306 and to act as a buffer for balancing the pressure differential due to the variation in densities.

Figure 11:
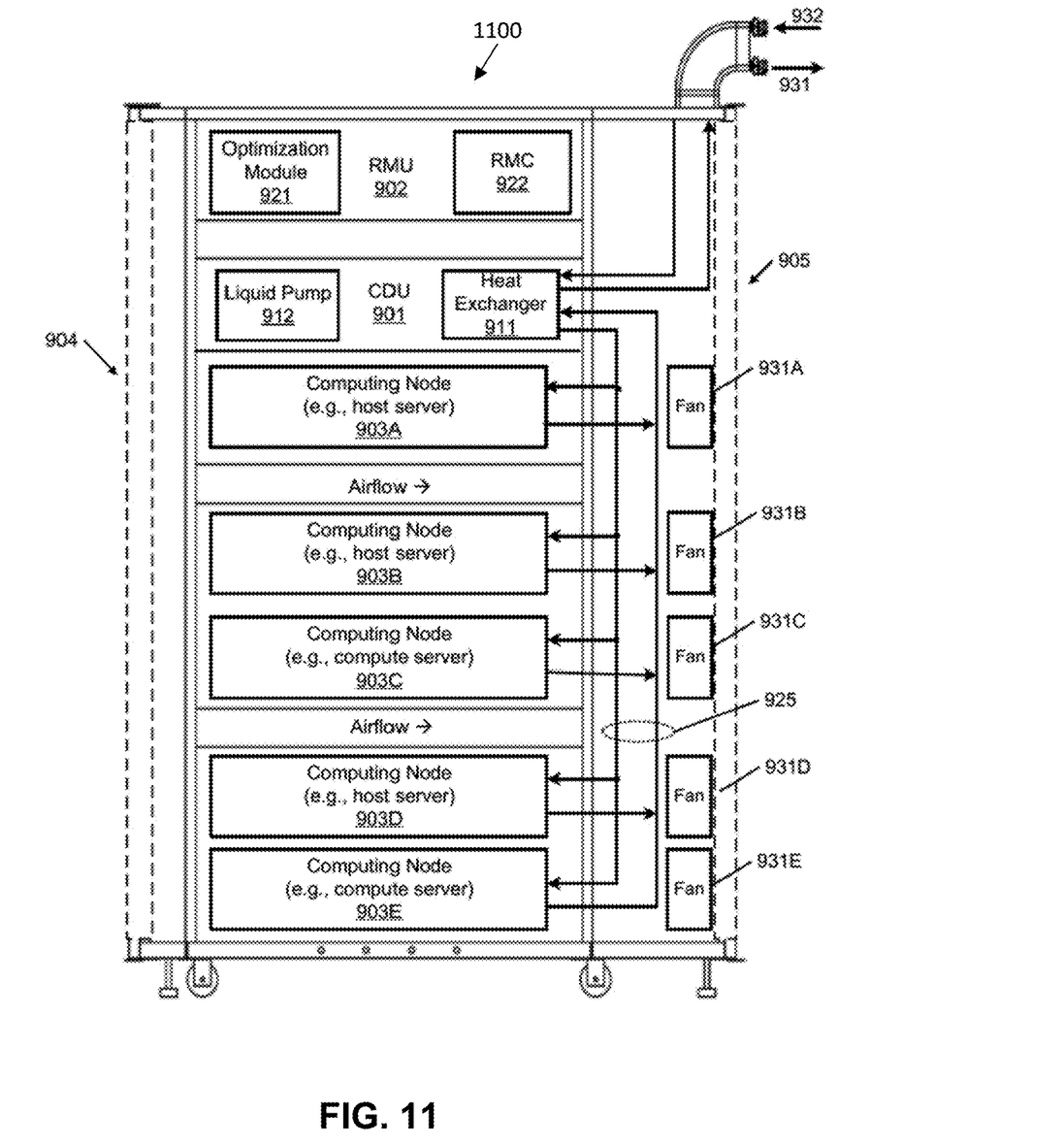
FIG. 11 shows an example of an electronic rack containing a backup battery pack according to one embodiment.

FIG. 11 is a block diagram illustrating an example of an electronic rack according to one embodiment. Electronic rack 1100 may include one or more server slots to contain one or more servers respectively. Each server includes one or more information technology (IT) components (e.g., processors, memory, storage devices, network interfaces). Referring to Figure #, according to one embodiment, electronic rack 1100 includes, but is not limited to, CDU 901, rack management unit (RMU) 902 (optional), a power supply unit (PSU) 950, a BBU 910, and one or more server blades 903A-903D (collectively referred to as server blades 903). Server blades 903 can be inserted into an array of server slots respectively from frontend 904 or backend 905 of electronic rack 1100. The PSU 950 and/or BBU 910 may be inserted into any of server slots 903 within the electronic rack 1100.

Note that although there are only four server blades 903A-903D shown here, more or fewer server blades may be maintained within electronic rack 1100. Also note that the particular positions of CDU 901, RMU 902, PSU 950, BBU 910, and server blades 903 are shown for the purpose of illustration only; other arrangements or configurations of CDU 901, RMU 902, BBU 910, and server blades 903 may also be implemented. Note that electronic rack 1100 can be either open to the environment or partially contained by a rack container, as long as the cooling fans can generate airflows from the frontend to the backend.

In addition, a fan module can be associated with each of the server blades 903, and BBU 910. In this embodiment, fan modules 931A-931E, collectively referred to as fan modules 931, and are associated with server blades 903A-903D and BBU 910 respectively. Each of the fan modules 931 includes one or more cooling fans. Fan modules 931 may be mounted on the backends of server blades 903 and BBU 910 to generate airflows flowing from frontend 904, traveling through the air space of the sever blades 903, and existing at backend 905 of electronic rack 1100.

In one embodiment, CDU 901 mainly includes heat exchanger 911, liquid pump 912, and a pump controller (not shown), and some other components such as a liquid reservoir, a power supply, monitoring sensors and so on. Heat exchanger 911 may be a liquid-to-liquid heat exchanger. Heat exchanger 911 includes a first loop with inlet and outlet ports having a first pair of liquid connectors coupled to external liquid supply/return lines 931-932 to form a primary loop. The connectors coupled to the external liquid supply/return lines 931-932 may be disposed or mounted on backend 905 of electronic rack 1100. The liquid supply/return lines 931-932 are coupled to a set of room manifolds, which are coupled to an external heat removal system, or extremal cooling loop. In addition, heat exchanger 911 further includes a second loop with two ports having a second pair of liquid connectors coupled to liquid manifold 925 to form a secondary loop, which may include a supply manifold to supply cooling liquid to server blades 903 and a return manifold to return warmer liquid back to CDU 901. Note that CDUs 901 can be any kind of CDUs commercially available or customized ones. Thus, the details of CDUs 901 will not be described herein. As an example, cooling device 108 shown in FIG. 7 may connect to 925 to complete a full fluid loop.

Each of server blades 903 may include one or more IT components (e.g., central processing units or CPUs, graphical processing units (GPUs), memory, and/or storage devices). Each IT component may perform data processing tasks, where the IT component may include software installed in a storage device, loaded into the memory, and executed by one or more processors to perform the data processing tasks. At least some of these IT components may be attached to the bottom of any of the cooling devices as described above. Server blades 903 may include a host server (referred to as a host node) coupled to one or more compute servers (also referred to as computing nodes, such as CPU server and GPU server). The host server (having one or more CPUs) typically interfaces with clients over a network (e.g., Internet) to receive a request for a particular service such as storage services (e.g., cloud-based storage services such as backup and/or restoration), executing an application to perform certain operations (e.g., image processing, deep data learning algorithms or modeling, etc., as a part of a software-as-a-service or SaaS platform). In response to the request, the host server distributes the tasks to one or more of the performance computing nodes or compute servers (having one or more GPUs) managed by the host server. The performance compute servers perform the actual tasks, which may generate heat during the operations.

Electronic rack 1100 further includes optional RMU 902 configured to provide and manage power supplied to servers 903, fan modules 931, and CDU 901. Optimization module 921 and RMC 922 can communicate with a controller in some of the applications. RMU 902 may be coupled to power supply unit 950 to manage the power consumption of the power supply unit. The power supply unit 950 may include the necessary circuitry (e.g., an alternating current (AC) to direct current (DC) or DC to DC power converter, backup battery, transformer, or regulator, etc.,) to provide power to the rest of the components of electronic rack 1100.

In one embodiment, RMU 902 includes optimization module 921 and rack management controller (RMC) 922. RMC 922 may include a monitor to monitor operating status of various components within electronic rack 1100, such as, for example, computing nodes 903, CDU 901, and fan modules 931. Specifically, the monitor receives operating data from various sensors representing the operating environments of electronic rack 1100. For example, the monitor may receive operating data representing temperatures of the processors, cooling liquid, and airflows, which may be captured and collected via various temperature sensors. The monitor may also receive data representing the fan power and pump power generated by the fan modules 931 and liquid pump 912, which may be proportional to their respective speeds. These operating data are referred to as real-time operating data. Note that the monitor may be implemented as a separate module within RMU 902.

Based on the operating data, optimization module 921 performs an optimization using a predetermined optimization function or optimization model to derive a set of optimal fan speeds for fan modules 931 and an optimal pump speed for liquid pump 912, such that the total power consumption of liquid pump 912 and fan modules 931 reaches minimum, while the operating data associated with liquid pump 912 and cooling fans of fan modules 931 are within their respective designed specifications. Once the optimal pump speed and optimal fan speeds have been determined, RMC 922 configures liquid pump 912 and cooling fans of fan modules 931 based on the optimal pump speed and fan speeds.

As an example, based on the optimal pump speed, RMC 922 communicates with a pump controller of CDU 901 to control the speed of liquid pump 912, which in turn controls a liquid flow rate of cooling liquid supplied to the liquid manifold 925 to be distributed to at least some of server blades 903. Therefore, the operating condition and the corresponding cooling device performance are adjusted. Similarly, based on the optimal fan speeds, RMC 922 communicates with each of the fan modules 931 to control the speed of each cooling fan of the fan modules 931, which in turn control the airflow rates of the fan modules 931. Note that each of fan modules 931 may be individually controlled with its specific optimal fan speed, and different fan modules and/or different cooling fans within the same fan module may have different optimal fan speeds. According to one embodiment, BBU 910 can be implemented as any of the BBUs described above as shown in FIGS. 8-10.

Note that some or all of the IT components of servers 903 may be attached to any one of the cooling devices described above, either via air cooling using a heatsink or via liquid cooling using a cold plate. One server may utilize air cooling while another server may utilize liquid cooling. Alternatively, one IT component of a server may utilize air cooling while another IT component of the same server may utilize liquid cooling. In addition, a switch is not shown here, which can be either air cooled or liquid cooled.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A backup battery unit, comprising:
   one or more battery cells immersed in cooling liquid contained in an immersion tank, the immersion tank comprising a temperature sensor to sense a temperature of the cooling liquid;
   a first direct-current to-direct-current (DC/DC) converter electronically coupled to the battery cells and to an external power source for converting and controlling a charging voltage obtained from the external power source to charge the battery cells;
   a cooling-liquid pump for driving cooling liquid to the battery cells; and
   a microcontroller coupled to the temperature sensor, the first DC/DC converter, and the cooling-liquid pump, wherein the microcontroller is configured to control operations of the cooling-liquid pump based on temperature data obtained from the temperature sensor and an electrical current of the first DC/DC converter.

2. The backup battery unit of claim 1, wherein the cooling-liquid pump is activated when the microcontroller receives a signal from the temperature sensor indicating that a temperature of the cooling liquid has risen above a threshold level.

3. The backup battery unit of claim 1, further comprising a second DC/DC converter coupled to the battery cells and the cooling-liquid pump for regulating a voltage level at the cooling-liquid pump.

4. The backup battery unit of claim 3, wherein a speed of the cooling-liquid pump is controlled by a pulse-width modulated (PMW) control signal generated by the microcontroller.

5. The backup battery unit of claim 1, further comprising a current sensor for measuring a charge current and a discharge current of the battery cells, wherein the current sensor is electronically coupled to the microcontroller.

6. The backup battery unit of claim 1, further comprising a switch coupled to the first DC/DC converter and the battery cells for controlling charging of the battery cells, wherein when the switch is closed the battery cells are charging and when the switch is open the battery cells are not charging.

7. The backup battery unit of claim 6, wherein the switch is a bidirectional power switch for charging and discharging of the battery cells.

8. The backup battery unit of claim 1, wherein the immersion tank further comprises a liquid-level sensor for measuring a liquid level of the cooling liquid inside the immersion tank.

9. The backup battery unit of claim 8, wherein the microcontroller:

receives a signal from the liquid-level sensor indicating that the liquid level in the immersion tank has exceeded a threshold level; and
   in response to the signal, sends a control signal to the cooling-liquid pump to reduce a speed of the pump or to disengage the pump.

10. The backup battery unit of claim 1, further comprising a heat exchanger coupled to the immersion tank via a coolant supply line and coolant return line that carries the cooling liquid to form a battery cell liquid cooling loop.

11. The backup battery unit of claim 10, wherein the heat exchanger is a liquid-to-liquid heat exchanger capable of being coupled to a rack liquid cooling system to form a rack liquid cooling loop of an electronic rack.

12. The backup battery unit of claim 10, wherein the heat exchanger is a liquid-to-air heat exchanger.

13. The backup battery unit of claim 9, further comprising a cooling fan, wherein the microcontroller is configured to control operations of the cooling fan based on the temperature data obtained from the temperature sensor and an electrical current of the first DC/DC converter for cooling the one or more battery cells.

14. An electronic rack, comprising:
   a plurality of server blades arranged in a stack, each server blade including one or more servers to provide data processing services;
   a power supply coupled to the server blades to provide power to operate the servers; and
   a backup battery unit (BBU) coupled to the server blades to provide backup power to the servers when the power supply is unable to provide power, wherein the backup battery unit comprises:
      one or more battery cells immersed in cooling liquid contained in an immersion tank, the immersion tank comprising a temperature sensor to sense a temperature of the cooling liquid;
      a first direct-current to-direct-current (DC/DC) converter electronically coupled to the battery cells and to the power supply for converting and controlling a charging voltage obtained from the power supply to charge the battery cells;
      a cooling-liquid pump for driving the cooling liquid to the battery cells; and
      a microcontroller coupled to the temperature sensor, the first DC/DC converter, and the cooling-liquid pump, wherein the microcontroller is configured to control operations of the cooling-liquid pump based on temperature data obtained from the temperature sensor and an electrical current of the first DC/DC converter.

15. The electronic rack of claim 14, wherein the cooling-liquid pump is activated when the microcontroller receives a signal from the temperature sensor indicating that a temperature of the cooling liquid has risen above a threshold level.

16. The electronic rack of claim 14, further comprising a second DC/DC converter coupled to the battery cells and the cooling-liquid pump for regulating a voltage level at the cooling-liquid pump.

17. The electronic rack of claim 16, wherein a speed of the cooling-liquid pump is controlled by a pulse-width modulated (PMW) control signal generated by the microcontroller.

18. The electronic rack of claim 14, wherein the BBU further comprises a current sensor for measuring a charge current and a discharge current of the battery cells, wherein the current sensor is electronically coupled to the microcontroller.

19. The electronic rack of claim 18, wherein the switch is a bidirectional power switch for charging and discharging of the battery cells.

20. The electronic rack of claim 14, wherein the immersion tank further comprises a liquid-level sensor for measuring a liquid level of the cooling liquid inside the immersion tank.

* * * * *